(No Model.)
J. FITZGERALD.
COMBINED GAS AND ELECTRIC LIGHT BRACKET.
No. 473,661. Patented Apr. 26, 1892.
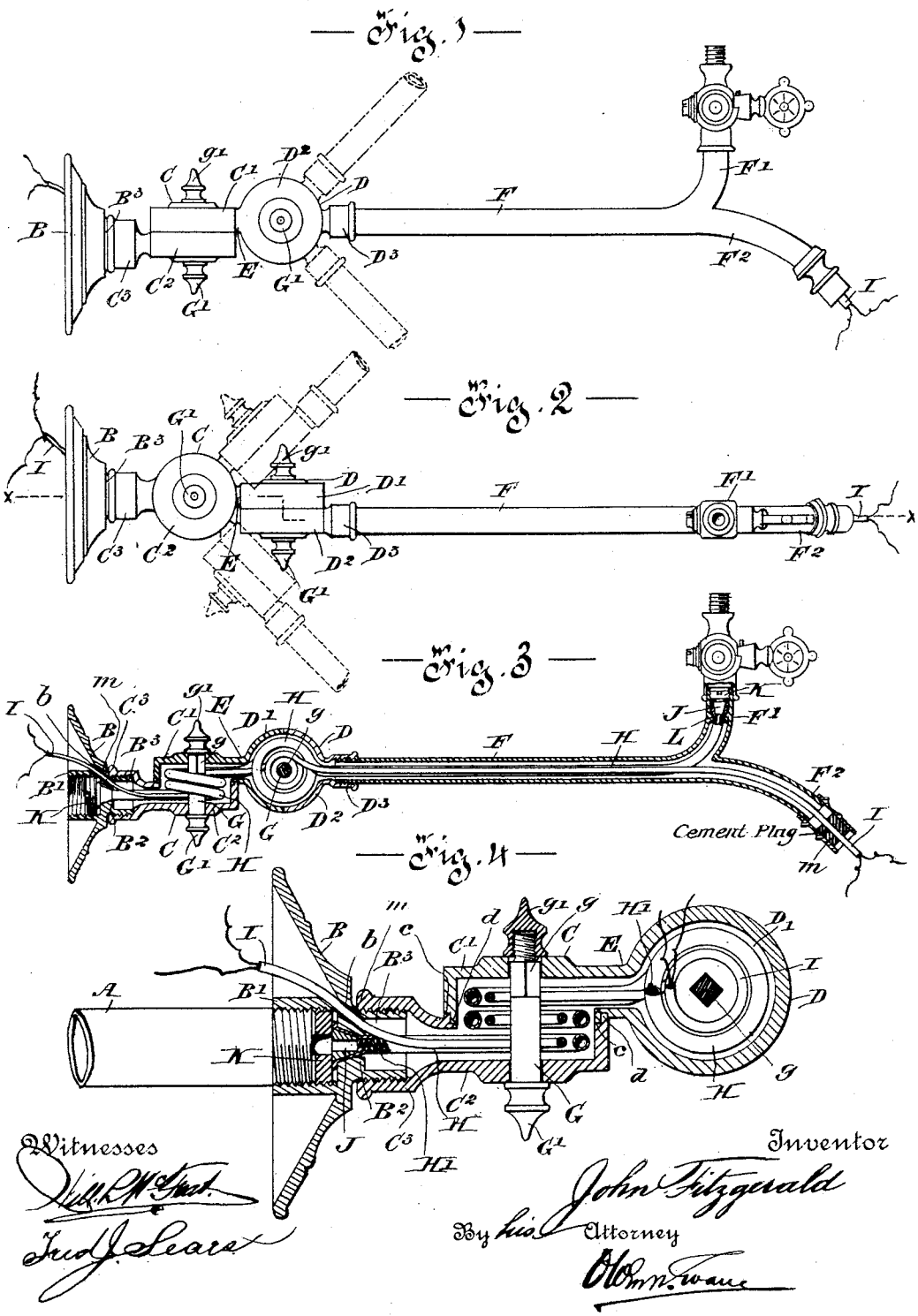

UNITED STATES PATENT OFFICE.

JOHN FITZGERALD, OF MONTREAL, CANADA.

COMBINED GAS AND ELECTRIC-LIGHT BRACKET.

SPECIFICATION forming part of Letters Patent No. 473,661, dated April 26, 1892.

Application filed July 14, 1891. Serial No. 399,520½. (No model.)

*To all whom it may concern:*

Be it known that I, JOHN FITZGERALD, of the city of Montreal, in the district of Montreal and Province of Quebec, Canada, have invented certain new and useful Improvements in Combination Gas and Electric-Light Brackets; and I do hereby declare that the following is a full, clear, and exact description of the same.

This invention relates to universal-jointed wall-brackets of twin form for gas and electric lighting, and has for its object to improve the construction of same in point of simplicity and secure a better gas-passage and a reduction of the possibilities of the electric current becoming short-circuited.

The principal feature of the invention consists in constructing the universal joint in two cylindrical portions to form chambers in which the insulated electric wires and a rubber tubing for the gas can be coiled in place naturally, the cylindrical portions being each composed of two half-sections held together by a central axial pin or bolt and nut and one half-section of one of the cylindrical portions being connected rigidly by a tubular neck to another half-section of the other cylindrical portion, the one being at right angles to the other axially.

The use of the rubber tubing for the passage of the gas through the bracket is another feature of my invention, the object being to keep the gas out of contact with the electric wires, or rather their coverings, which under some conditions might be detrimental to them.

To prevent kinking of the tubing at any point, I arrange a spiral spring within it for the whole of its length, and at each end insert a perforated conical wedge, which wedge, upon being forced inward by screw-nuts threaded into the metal sections of the bracket, serves to press the tubing outward into close contact with annular shoulders in the bracket-sections, so as to form perfectly-gas-tight joints.

For full comprehension, however, of the invention reference must be had to the annexed drawings, in which like symbols indicate corresponding parts, and wherein—

Figure 1 is a side elevation of the bracket with lamp, burner, and globe omitted; Fig. 2, a plan view of same; Fig. 3, a longitudinal vertical section of same on line $x$ $x$, Fig. 2; and Fig. 4, an enlarged sectional detail of the gas-tubing and tightening appliances.

A is the gas-pipe or nipple to which the bracket is attached. The bracket comprises, first, a bell or saucer shaped disk B, adapted to bear against the wall and having a central screw-threaded interior tubular boss B' for attachment to the gas-pipe A, an annular shoulder $B^2$, and an exterior screwed tubular boss $B^3$, the shoulder being bored obliquely, as at $b$, for the passage of the electric wires. The next succeeding parts are the two cylindrical portions forming the universal joint, the axis of the one C being vertical and that of the other D horizontal, each being composed of half-sections C' $C^2$ and D' $D^2$, those C' D' being rigidly connected together by a tubular neck E and those $C^2$ $D^2$ having tubular screwed extensions or nipples $C^3$ $D^3$, the former for connection with the boss $B^3$ of the disk B and the latter to receive the main length of piping F of the bracket, which terminates at its outer end in two branches F' $F^2$, respectively, for gas-burner and electric-lamp attachments. The half-sections C' $C^2$ D' $D^2$ have their meeting faces formed to present corresponding depressions $c$ and rims $d$, so as to effect a better joint or socket and they are held in juxtaposition by the pins or bolts G, which are circular at one end and provided with heads G' and at the other end squared for a portion of their length, as at $g$, and screw-threaded to receive the nut $g'$. The half-sections $C^2$ $D^2$ also have central circular perforations and those C' D' squared ones to fit the respective circular and square portions of the pins G, so that there will be no rub between the half-sections C' D' and the nuts $g'$, whereby these latter would be liable to work loose.

H is a length of rubber tubing containing throughout its length a spiral spring H', which serves to prevent kinking or collapsing when coiled within the cylindrical chambers, as shown in Fig. 3.

I is another rubber tubing coiled in the chambers C D, the same as the one H, and containing both electrical wires, properly insulated, or each wire could have a separate rubber tubing.

J J are the perforated conical wedges inserted in the ends of the tubing H, and K K the perforated screw-nuts for forcing them into the tubing, so as to press same tightly against the shoulder B² of the disk B in the one case and the shoulder L at the end of the branch pipe F' in the other.

To keep the gas-passage intact in the event of the tubing H leaking by some unforseen circumstance, I seal up the apertures where the electric wires enter and leave the bracket, as shown at $m$ $m$, with any suitable cement.

What I claim is as follows:

1. A combination gas and electric bracket having tubular parts, means for attachment, and a universal joint formed of two hollow cylindrical portions arranged axially at right angles to each other and each composed of half-sections with their inner faces held together in swiveling relation, means for holding such sections to each other, and a rigid tubular connection between one half-section of one cylindrical portion and another half-section of the other cylindrical portion.

2. In a combination gas and electric bracket having tubular parts, means for attachment, and a universal joint, a rubber tubing extending between the entry and exit ends of the gas-passage of the bracket proper, and means for holding same firmly and closely in contact with the bracket at such points, as set forth.

3. In a combination gas and electric bracket having tubular parts, means for attachment, and a universal joint, a rubber tubing extending between the entry and exit ends of the gas-passage of the bracket proper, means for holding same firmly and closely in contact with the bracket at such points, and a spiral spring arranged within said tubing, for the purposes set forth.

4. In a combination gas and electric bracket having tubular parts, means for attachment, and a universal joint, a rubber tubing extending between the entry and exit ends of the gas-passage of the bracket proper, shoulders in the bracket at said points, perforated wedges inserted in the ends of said tubing, and perforated screw-nuts adapted to bear upon said wedges and force them inward to press the tubing firmly and closely in contact with said shoulders.

5. In a combination gas and electric bracket having tubular parts, means for attachment, and a universal joint, a common passage-way for the gas and electric wires formed by said tubular parts and joined for the greater length centrally of the bracket, and separate end channels to and from said common passage-way for the electric wires, and means for plugging up said channels after such wires are in place, as and for the purpose set forth.

6. A combination gas and electric bracket having tubular parts, means for attachment, and a universal joint formed of two hollow cylindrical portions arranged axially at right angles to each other and each composed of half-sections with their inner faces held together in swiveling relation by central axial connections, and a rigid tubular connection between one half-section of one cylindrical portion and another half-section of the other cylindrical portion.

Montreal, July 9, 1891.

JOHN FITZGERALD.

Witnesses:
J. H. FITZGERALD,
WILL P. MCFEAT.